Figure 1:
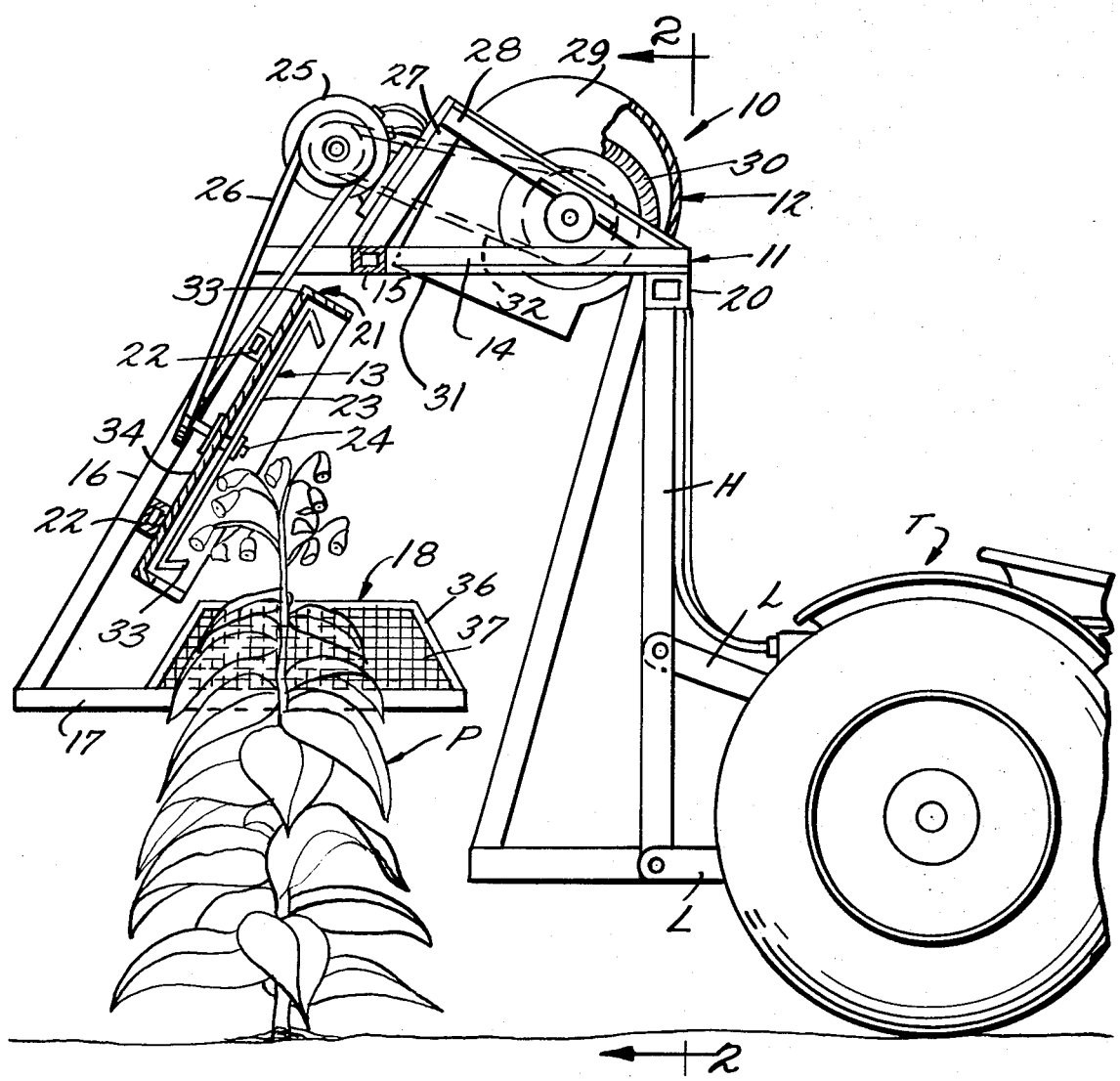

United States Patent
Hammond

[15] 3,695,013
[45] Oct. 3, 1972

[54] APPARATUS FOR TOPPING STALK-TYPE PLANTS

[72] Inventor: Walter Cecil Hammond, Tifton, Ga.
[73] Assignee: Powell Manufacturing Company, Inc., Bennettsville, S.C.
[22] Filed: June 15, 1971
[21] Appl. No.: 153,382

Related U.S. Application Data

[63] Continuation-in-part of Ser. No. 114,488, Feb. 10, 1971, abandoned.

[52] U.S. Cl. ................................................56/63
[51] Int. Cl. ............................................A01d 45/02
[58] Field of Search............56/53, 56, 57, 58, 59, 63, 56/16.6

[56] References Cited

UNITED STATES PATENTS

| | | | |
|---|---|---|---|
| 657,411 | 9/1900 | Hamm | 56/500 |
| 1,805,927 | 5/1931 | Sharp | 56/16.6 |
| 2,934,879 | 5/1960 | Jones | 56/63 |
| 3,025,653 | 3/1962 | Ackermann | 56/53 |
| 3,178,873 | 4/1965 | Meyer | 56/27.5 |
| 3,482,379 | 12/1969 | Splinter et al. | 56/63 |
| 3,561,197 | 2/1971 | Willett | 56/63 |

*Primary Examiner*—Russell R. Kinsey
*Attorney*—Cushman, Darby and Cushman

[57] ABSTRACT

Apparatus for topping stalk-type plants such as tobacco, corn and the like including a frame structure adapted to be moved along a row of stalk-type plants in a position of general clearance with respect to the topped plants, a power operated blower assembly carried by the frame structure operable in response to the movement of the frame structure along the row to establish a continuous flow of air in a direction generally downwardly on the top portion of successive plants in the row with a velocity sufficient to deflect the top leaves of the plants downwardly and a power operated cutting assembly carried by the frame structure operable in response to the movement of the frame structure along the row to cut and remove the top portion of successive plants in the row at a predetermined stalk height without cutting leaves attached to the stalk below the predetermined height by virtue of the leaves having been deflected downwardly by the flow of air, the power operated cutting assembly preferably embodies a high speed rotary cutting blade particularly suited for topping tobacco plants operable to cut the top portion of the tobacco plants into small particles and impart a movement thereto, the rotary cutting blade being disposed in cooperating relation with a shroud assembly for confining the movement of the small particles to a predetermined path substantially out of contact with the tobacco plants of the row and adjacent rows.

17 Claims, 2 Drawing Figures

APPARATUS FOR TOPPING STALK-TYPE PLANTS

This application constitutes a continuation-in-part of my co-pending application Ser. No. 114,488 filed Feb. 10, 1971, and now abandoned, for a Mechanical Tobacco Topper.

This invention relates to the topping of stalk-type plants and more particularly to apparatus for cutting the top portion of successive stalk-type plants in response to the movement of the apparatus along a row of such plants.

It is known that the yield of stalk-type agricultural plants can be enhanced by cutting the flowering top portions of the plant during an appropriate time in the growth cycle. Two examples of plants where topping serves to materially increase the yield are tobacco and corn. Insofar as tobacco topping is concerned, the primary desirability of removing the flowering top of tobacco plants is to enable the nutrients in the plant, normally utilized to sustain the growth of the flowering top portion, to increase the growth of the leaves, which constitute the productive yield of the plant.

For example, studies have indicated that the removal of the flowering portion of bright leaf tobacco plants will serve to increase the crop value between 24–34 percent in terms of the yield per acreage of tobacco.

The increase in net income due to such tobacco topping operations is, however, not without limitation because of the costly labor operations required in manually removing the flowering top portions one at a time in the field. Various chemicals and methods of application have therefore been devised to control tobacco suckers which has permitted some reduction in the labor force required since such chemicals, which may be sprayed on the tobacco leaf axils as soon as possible after topping, will inhibit cell division which in turn will inhibit continued sucker growth.

Also, reasonably favorable results have been obtained for increased tobacco value which was hand-suckered at the early flower stage. These results showed that the value of tobacco which was suckered with maleic hydrazide increased when the tobacco was topped at the full flower stage. Studies have also been performed on the topping height desirable to produce the greatest yields and it was found that topping the tobacco plant at 12 leaves (about 30 inches in height) did not reduce yields below plants topped at 20 leaves as long as the plant population was increased to maintain the same number of leaves per acre. Further studies have found tobacco yields to increase with topping heights up to 23 leaves, but the tobacco quality was found to be lower with greater topping heights. Tobacco quality was also found to be lower when the plants were topped late.

An agricultural implement in the form of a mechanical topper is also known to have been devised for topping of tobacco plants which makes use of converging belts to hold and convey the tobacco tops to a sickle mechanism which cuts the tops in the field. Such device has, however, met with only limited success because of its intricate design, high cost and complex operation.

In the case of corn, the desirability of topping is to remove the tassel so as to minimize self-pollination as well as to enhance the growth of the ears by eliminating the need to sustain the growth of the tassel. Topping devices embodying rotary cutters have been proposed for corn plants.

A significant problem encountered in previously proposed topping devices is in providing for the selective cutting of the top portion of the plant without damaging or cutting the leaves of the plant left after the cutting operation. Leaf damage is particularly critical in the case of topping tobacco plants, since damage to the leaf constitutes damage to the productive yield. In corn, leaf damage does not directly result in productive yield damage but the quality and quantity of the yield can be detrimentally affected where leaf damage takes place.

Accordingly, it is an object of the present invention to provide an apparatus for topping stalk-type plants, such as tobacco and corn, embodying a power operated blower means for establishing a flow of air in a direction generally downwardly on the top portion of successive plants as the apparatus is moved along the row and with a velocity sufficient to deflect the leaves downwardly and a cutting means mounted in cooperating relationship to the blower means for cutting and removing the top portion of successive plants in the row at a predetermined stalk height without cutting the top leaves attached to the portion of the stalk below the predetermined height by virtue of the leaves having been deflected downwardly by the flow of air.

Another problem which is encountered more specifically in tobacco topping is the problem of disposing of the removed top portions of the tobacco plants in a way in which they are not deposited on the leaves of the plants as the apparatus is moved along the row. It will be understood that if the removed top plant portions are deposited on the leaves of the tobacco plants, the portions of the leaves so contacted cannot develop properly due to lack of sunlight, etc. In the tobacco topping devices heretofore proposed, the cutting means served to sever the stalk at a predetermined height while the top portion was held between cooperating conveyors, which conveyors were used to move the cut top portion away from the topped plant. The utilization of such conveyors unduly complicated the apparatus both in terms of cost and operation. Moreover, such conveyors tended to cause leaf damage themselves and to otherwise malfunction during operation, thus failing to maintain the cut top portions out of contact with the topped plants.

Accordingly, it is a further object of the present invention to provide a tobacco topping apparatus of the type described having an improved cutting means in the form of a rotary cutting blade structure operable not only to cut the top portion of a plant engaged thereby at a predetermined stalk height, but to cut the top portion of the tobacco plant into small particles and to impart a motion to such particles so that by confining the motion of the particles to a predetermined path out of contact with the topped plant, the above-mentioned problems of handling the removed top portion of the plant heretofore encountered are substantially eliminated.

Still another object of the present invention is to provide a stalk-type plant topping apparatus of the type described which is simple in construction, efficient in operation, and economical to manufacture and maintain.

These and other objects of the present invention will become more apparent during the course of the following detailed description and appended claims.

The invention may best be understood with reference to the accompanying drawings wherein an illustrative embodiment is shown.

Figure 2:
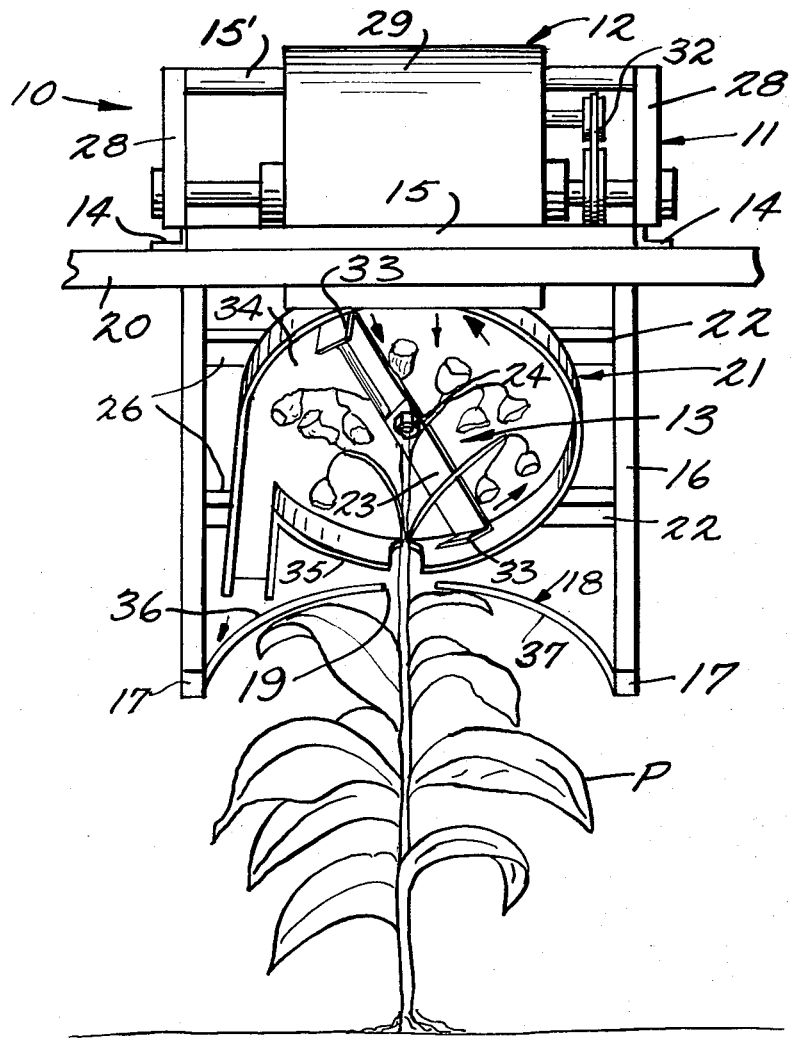

In the drawings:

FIG. 1 is a side elevational view of a plant topping apparatus embodying the principles of the present invention, the apparatus being shown partly broken away for the purpose of clearer illustration, and connected with a tractor for moving the apparatus along a row of plants, one of which is shown; and FIG. 2 is a front elevational view of the apparatus looking in the direction of the arrows from line 3—3 of FIG. 1.

Referring now more particularly to the drawings, there is shown therein a plant topping apparatus, generally indicated at 10, embodying the principles of the present invention. Basically, the apparatus 10 is comprised of a frame means, generally indicated at 11, a power operated blower means, generally indicated at 12, mounted on the frame means 11, and a power operated cutting means, generally indicated at 13, mounted on the frame means in cooperating relationship with the blower means.

The frame means 11 may be of any desirable construction. In the preferred example shown, the frame means is formed of conventional constructional elements, such as angle irons and hollow elongated elements, suitably welded together. In the embodiment shown the frame means includes a main horizontally extending section formed from a pair of longitudinally extending horizontal frame members 14 interconnected by forward and rearward transverse frame members 15. Extending downwardly and rearwardly from the end of each longitudinal frame member 14 is an inclined frame member 16, the frame members 16 being spaced apart laterally a distance sufficient to permit passage of the plant therebetween. Secured to the lower end of each inclined frame member 16 and extending forwardly therefrom is a rod member 17.

The rod members 17 serve to support a pair of stalk guiding and leaf shielding units, generally indicated at 18, which are spaced apart to provide a longitudinally extending opening 19 therebetween through which the upper flowering portion of a tobacco plant extends during the movement of the apparatus 10 along a row of such plants.

It will be understood that the movement of the apparatus 10 along the row can be accomplished in any conventional manner. In the embodiment shown, the frame means 11 is rigidly attached, by any suitable means, to the upper surface of a high clearance tool bar 20. The high clearance tool bar 20 is mounted on the upper end of a conventional hitch structure H which, in turn, is mounted on the rear of a tractor T for movement into any desirable position of vertical adjustment, as by convention three-point hitch links L.

The tractor arrangement shown is useful in tobacco fields where the fifth row of plants is eliminated in accordance with conventional practice. Such practice contemplates servicing two adjacent rows on opposite sides of the eliminated fifth row in which the tractor runs. Consequently, it would be desirable under these circumstances to provide a high clearance tool bar 20 which extends laterally over at least two rows and to mount two devices 10 thereon so as to simultaneously top the plants in at least two adjacent rows in one direction. The plants of the other two adjacent rows can be topped when the tractor moves through the same eliminated fifth row in the opposite direction.

It will also be understood that the apparatus 10 in any desired number may be mounted on a high clearance vehicle in fields where the fifth row is planted rather than eliminated. Likewise, the mounting of the apparatus 10 on the high clearance machine should make provision for moving the apparatus into any desirable position of vertical adjustment.

The cutting means 13 is preferably of a type which is capable of not only cutting and removing the top portions of the plants but further of cutting the removed top portions into small particles and of imparting a motion to the small particles. The tobacco plant topping apparatus 10 of the present invention contemplates a shroud structure, generally indicated at 21, which is mounted in cooperating relation with the cutting means so as to confine the movement of the small plant particles along a path out of contact with the plants of the row as well as plants of the adjacent rows. In order to mount the shroud means 21 on the frame means 11, the latter includes a pair of upper and lower support members extending transversely across the inclined frame members 16 with their ends rigidly secured, as by welding or the like, to the forward surface of the frame members 16.

In the preferred embodiment shown, the cutting means 13 is in the form of an elongated cutting blade structure 23, connected at its mid-point to the forward end of a shaft 24 as by a nut or the like. The shaft 24 is rotatably mounted with its axis extending downward and forwardly at an angle to the horizontal of approximately 30°.

It will be understood that any suitable means (including the tractor PTO) may utilized for effecting the rotational movement of the shaft 24 and the cutter blade 23 connected therewith. In the embodiment shown, the drive means comprises a hydraulic motor 25 having an output drive shaft connected with the shaft 24 by a conventional belt and pulley assembly 26. In accordance with conventional practice, the hydraulic motor 25 may be driven by a hydraulic pump embodied in the tractor T and interconnected with the motor by suitable hydraulic lines, such as schematically illustrated in the drawings.

In the embodiment shown, the motor 25 is secured to the frame means 11 by suitable mounting brackets connected at one end to the central portion of the rearward transverse frame member 15 and at its other end to the central portion of an upper transverse frame member 15'. Each end of the transverse frame member 15' is rigidly secured to the intersection between two angularly related frame members 27 and 28, the opposite ends of which are fixedly secured respectively to an associated longitudinal frame member 14.

The blower means 12 may be of any conventional design but is preferably in the form of a conventional squirrel cage fan which includes a conventional hood or housing 29 within which is mounted a rotor, indicated at 30, rotatable about a transverse horizontal axis, as by a shaft having its endings mounted in bearings secured to the frame members 28. The housing 29 is of conventional design providing axial inlet openings for the fan rotor 30 and a tangentially extending discharge opening, indicated at 31, from which a flow of air, created by the rotor 30 is directed generally downwardly so as to deflect downwardly the top leaves of a plant disposed therebelow.

Here again, any suitable means may be utilized for effecting rotation of the blower means 12. In the preferred embodiment shown, the hydraulic motor 25 is utilized for this purpose as well, the output shaft thereof being connected with the fan rotor shaft by a conventional pulley and belt assembly 32. The position of the flow of air established by blower means 12 is such as to cooperate with the cutting means 13 to enable the cutting means to effect the cutting action while the top leaves are deflected downwardly by virtue of the flow of air. In the embodiment shown, it will be understood that the discharge opening 31 is disposed adjacent to the upper end of the shroud means 21 so as to direct the flow of air downwardly and rearwardly at a position just forwardly of the inclined cutting blade 23. The velocity of the flow of air must be sufficient to effect the downward deflection of the top leaves and should not be sufficiently strong as to cause deflection of the entire top portion of the plant downwardly out of the range of the cutting means 13. In the embodiment shown, the fan rotor is approximately 12 inches, and is preferably rotated at 500 rpm resulting in a flow of air through the discharge outlet 31 of approximately 3,000 cfm. It will be understood that the above figures are exemplary only and that the size and capacity of the blower can be varied considerably with the functional capabilities mentioned above. A preferred range of operation is between 2,500 cfm and 5,000 cfm.

As previously indicated, the cutting means 13 is preferably of the type capable of cutting the plant top into small particles and imparting a motion to the particles so that such motion can be confined by the shroud means 21 along a path out of contact with the topped plants within the row as well as adjacent rows. In the embodiment shown, the cutting blade 23 is approximately 22 inches in longitudinal extent and is rotated at a speed of approximately 1,800 rpm. In order to insure a clean horizontal cut to the upper end of the plant stalk, blade 23 has its end portions bent forwardly, as indicated at 33, at an angle approximately 60°. The angular relationship of the end portions 33 insure that the end portions are disposed approximately horizontally as they move through the lowest point of their rotational movement. In the embodiment shown, the bent blade ends 33 have a tip speed of approximately 11,000 fpm. Here again, the figures set forth above are exemplary only and considerable variation in operating speed may be utilized to obtain the functional attributes mentioned above, taking into account the horsepower requirements involved. An examplary range of tip speed is from 6,000 fpm to 16,000 fpm.

The shroud means 21 is preferably in the form of an inclined wall 34 which is suitably fixed to the forward surface of the support members 22 and carries at its central portion a suitable bearing in which the shaft 24 is journaled.

As best shown in FIG. 2, the wall 34 is generally in the form of a circle having a straight portion extending tangentially from the periphery thereof to help define a discharge area for the cut material. The shroud means 21 also includes a peripheral wall 35 extending perpendicularly from the edge of the wall 34 in generally coextensive relation with the cutting blade 23 and blade ends 33 thereof. It will be noted that the leading edges of the cutting blade 23 and the blade ends 33 are sharpened to facilitate the cutting action, the direction of the rotation being counter-clockwise as viewed in FIG. 2, so that a counter-clockwise movement is imparted to the plant particles by the engaged cutting blade. The peripheral wall 35 of shroud means 21 serves to confine the movement of the particles into a generally circular path which discharges tangentially downwardly.

With this arrangement, the particles are discharged onto the ground between adjacent rows during the movement of the apparatus along the row, thus assuring that the removed top plant particles will not be deposited onto the leaves of the plants in the row or adjacent rows.

The stalk guiding and leaf shielding means 18, in the preferred embodiment shown, is constructed of a pair of rods 36, each of which is generally U-shaped in configuration and is mounted with the free ends of its legs fixedly secured to the associated rod member 17. The forward leg of each rod 36 is curved upwardly and inwardly and extends rearwardly and inwardly so as to guide the stalk of the plant between the straight bight portions of the rods defining the opening 19.

In addition, a screen-like shield 37 is secured within the perimeter of each rod so as to hold the leaves deflected downwardly by the rod as the apparatus passes over successive plants P. The flow of air from the blower means 12 not only cooperates with the cutting means 13 but also with the rods and shields so that some of the leaves will be deflected downwardly by the flow of air and moved beneath the rods 36 and shields 37. It should be noted, however, that the flow of air constitutes the primary means for insuring that the leaves will be maintained out of contact with the cutter blade. Clearly, because the stalk guiding and leaf shielding means 18 must provide an opening 19 through which the stalk passes, all of the leaves cannot be maintained mechanically in downwardly deflected relation thereby. For example, the leaves which extend longitudinally rely solely upon the flow of air for their downward deflection. Consequently, the provision of a stalk guiding and leaf shielding means 18 is not essential to the proper operation of the apparatus 10 but, rather, constitutes a preferred arrangement which aids in the overall performance.

While a rotary blade cutting means is considered highly preferable for use in tobacco plant topping requirements, the advantages of the present invention resulting from the cooperation between the blower means 12 and the cutting means 13 can be obtained with any type of cutting means including the sickle type cutter previously mentioned and other severing cutters (as distinguished from disintegrating cutters). Cutters of this type may be useful with stalk-type plants other than tobacco, as for example, corn and the like.

It will also be understood that while the cutting means and blower means have been shown as separate assemblies driven by a single motor, it is within the contemplation of the present invention to drive the separate assemblies separately and to integrate the blower on the same shaft as the cutting blade.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. Apparatus for topping stalk-type plants comprising frame means adapted to be moved along a row of stalk-type plants in a position of general clearance with respect to the topped plants, power operated blower means carried by said frame means operable in response to the movement of said frame means along the row to establish a continuous flow of air in a direction generally downwardly on the top portion of successive plants in the row with a velocity sufficient to deflect the top leaves of the plants downwardly and power operated cutting means carried by said frame means operable in response to the movement of said frame means along the row to cut and remove the top portion of successive plants in the row at a predetermined stalk height without cutting leaves attached to the stalk below said predetermined height by virtue of said leaves having been deflected downwardly by said flow of air.

2. Apparatus as defined in claim 1 wherein said cutting means comprises a cutting blade structure and means mounting said cutting blade structure for rotation in a position to engage substantially the entire top portion of successive plants to thereby cut the top plant portions into small particles and impart a movement to such particles.

3. Apparatus as defined in claim 2 including means carried by said frame means in cooperating relation with said cutting blade for confining the movement of said small top plant particles to a predetermined path substantially out of contact with the plants of said row and adjacent rows.

4. Apparatus as defined in claim 3 wherein said cutting blade structure mounting means includes a rotary shaft fixedly connected with said cutting blade structure carried by said frame means with its axis extending downwardly and forwardly with respect to the direction of movement of said frame means along the row.

5. Apparatus as defined in claim 4 wherein the axis of said shaft is disposed at an angle of approximately 30° with respect to the horizontal.

6. Apparatus as defined in claim 5 wherein said cutting blade structure comprises an elongated blade connected at its mid-point to said shaft and extending radially outwardly therefrom in opposite directions, said blade having a portion adjacent each end thereof bent forwardly at an angle of approximately 120°.

7. Apparatus as defined in claim 3 wherein said power operated blower means comprises a squirrel cage fan assembly having a tangential discharge outlet opening downwardly and rearwardly at a position forwardly adjacent the upper portion of said particle confining means.

8. Apparatus as defined in claim 7 including laterally spaced guide structures carried by said frame means in a position of cooperating relation with said cutting means below and forwardly thereof, for receiving and guiding successive plant stalks therebetween and into cutting relation to said cutting means in response to the movement of said frame means along the row.

9. Apparatus for topping tobacco plants comprising frame means adapted to be moved along a row of tobacco plants in a position of general clearance with respect to topped tobacco plants, power operated blower means carried by said frame means operable in response to the movement of said frame means along the row to establish a continuous flow of air in a direction generally downwardly on the top portion of successive tobacco plants in the row with a velocity sufficient to deflect the top leaves of the plants downwardly, power operated rotary cutting means carried by said frame means operable in response to the movement of said frame means along the row of tobacco plants to cut the top portion of successive tobacco plants in the row at a predetermined stalk height into small particles and impart a movement thereto without cutting the tobacco leaves attached to the stalk below said predetermined height by virtue of said leaves having been deflected downwardly by said flow of air, and means carried by said frame means in cooperating relation with said rotary cutting means for confining the movement of said small particles to a predetermined path substantially out of contact with the tobacco plants of said row and adjacent rows.

10. Apparatus as defined in claim 9 wherein said rotary cutting means comprises a cutting blade structure and means mounting said cutting blade structure for rotation in a position to engage substantially the entire top portion of successive tobacco plants.

11. Apparatus as defined in claim 10 wherein said cutting blade structure mounting means includes a rotary shaft fixedly connected with said cutting blade structure and carried by said frame means with its axis extending downwardly and forwardly with respect to the direction of movement of said frame means along the row.

12. Apparatus as defined in claim 11 wherein the axis of said shaft is disposed at an angle of approximately 30° with respect to the horizontal.

13. Apparatus as defined in claim 12 wherein said cutting blade structure comprises an elongated blade connected at its mid-point to said shaft and extending radially outwardly therefrom in opposite directions, said blade having a portion adjacent each end thereof bent forwardly at an angle of approximately 120°.

14. Apparatus as defined in claim 13 wherein said means for confining the movement of said small particles includes an inclined wall disposed rearwardly of said cutting blade and a peripheral wall extending forwardly from the peripheral edge of said inclined wall, said walls defining a generally circular path having a tangential discharge outlet.

15. Apparatus as defined in claim 14 including laterally spaced guide structures carried by said frame means in a position of cooperating relation with said cutting blade below and forwardly thereof for receiving and guiding successive tobacco stalks therebetween and into cutting relation to said cutting blade in response to the movement of said frame means along the row.

16. Apparatus as defined in claim 15 wherein said peripheral wall is formed with a forwardly opening slot in the lower central portion thereof in longitudinal alignment with the lateral spacing between said guide structures.

17. Apparatus as defined in claim 16 wherein said power operated blower means comprises a squirrel cage fan assembly having a tangential discharge outlet opening downwardly and rearwardly at a position forwardly adjacent the upper portion of said peripheral wall.

* * * * *